US008588833B2

(12) United States Patent
Khoshnevis et al.

(10) Patent No.: US 8,588,833 B2
(45) Date of Patent: Nov. 19, 2013

(54) ASSIGNING AND COORDINATING UPLINK REFERENCE SIGNALS FOR COOPERATIVE COMMUNICATION

(75) Inventors: Ahmad Khoshnevis, Portland, OR (US); John M. Kowalski, Camas, WA (US); Sayantan Choudhury, Vancouver, WA (US); Kimihiko Imamura, Chiba (JP)

(73) Assignee: Sharp Laboratories of America, Inc., Camas, WA (US)

( * ) Notice: Subject to any disclaimer, the term of this patent is extended or adjusted under 35 U.S.C. 154(b) by 329 days.

(21) Appl. No.: 12/771,974

(22) Filed: Apr. 30, 2010

(65) Prior Publication Data
US 2011/0269489 A1 Nov. 3, 2011

(51) Int. Cl.
*H04W 60/00* (2009.01)

(52) U.S. Cl.
USPC ............ 455/509; 455/63.1; 455/68; 370/328; 370/329; 370/252; 370/400; 370/503

(58) Field of Classification Search
USPC ........... 455/63.1, 68, 509; 370/329, 400, 503, 370/252
See application file for complete search history.

(56) References Cited

U.S. PATENT DOCUMENTS

| | | | |
|---|---|---|---|
| 2008/0008212 A1* | 1/2008 | Wang et al. | 370/503 |
| 2008/0039098 A1 | 2/2008 | Papasakellariou et al. | |
| 2009/0067318 A1 | 3/2009 | Kowalski | |
| 2009/0080569 A1 | 3/2009 | Han et al. | |
| 2009/0262695 A1* | 10/2009 | Chen et al. | 370/329 |
| 2009/0262856 A1* | 10/2009 | Onggosanusi et al. | 375/267 |
| 2009/0290550 A1 | 11/2009 | Bhattad et al. | |
| 2010/0002800 A1 | 1/2010 | Kim et al. | |
| 2010/0008294 A1* | 1/2010 | Palanki et al. | 370/328 |
| 2010/0034177 A1* | 2/2010 | Santhanam | 370/338 |
| 2010/0080154 A1* | 4/2010 | Noh et al. | 370/310 |
| 2011/0080880 A1* | 4/2011 | Yin et al. | 370/329 |
| 2011/0267972 A1* | 11/2011 | Yoon et al. | 370/252 |

FOREIGN PATENT DOCUMENTS

| | | |
|---|---|---|
| WO | 2008/116027 | 9/2008 |
| WO | 2008/118810 | 10/2008 |

OTHER PUBLICATIONS

3GPP TS 36.213 V8.6.0, "Evolved Universal Terrestrial Radio Access (E-UTRA) Physical layer procedures (Release 8)," Mar. 2009.
3GPP TS 36.300 V9.0.0, "Evolved Universal Terrestrial Radio Access (E-UTRA) and Evolved Universal Terrestrial Radio Access Network (E-UTRAN); Overall Description; Stage 2 (Release 9)," Jun. 2009.
3GPP TS 36.211 V9.0.0, "Evolved Universal Terrestrial Radio Access (E-UTRA); Physical Channels and Modulation (Release 9)," Dec. 2009.
3GPP TS 36.321 V9.1.0, "Evolved Universal Terrestrial Radio Access (E-UTRA) Medium Access Control (MAC) protocol specification (Release 9)," Dec. 2009.

(Continued)

*Primary Examiner* — Bobbak Safaipour
(74) *Attorney, Agent, or Firm* — Austin Rapp & Hardman

(57) ABSTRACT

A method for assigning and coordinating uplink reference signals for cooperative communication is disclosed. Data about an assigned uplink reference signal sequence used by a wireless communication device is received at a non-serving base station. An uplink reference signal estimate is determined based on the data. The uplink reference signal estimate is used to coherently demodulate a signal received from the wireless communication device or is used to estimate an uplink channel between the non-serving base station and the wireless communication device.

36 Claims, 10 Drawing Sheets

(56) References Cited

OTHER PUBLICATIONS

3GPP TS 36.331 V9.1.0, "Evolved Universal Terrestrial Radio Access (E-UTRA) Radio Resource Control (RRC); Protocol specification (Release 9)," Dec. 2009.
3GPP TR 36.913 V9.0.0, "Evolved Universal Terrestrial Radio Access (E-UTRA) (LTE-Advanced) (Release 9)," Dec. 2009.
3GPP TR 36.814 V1.5.0, "Further Advancements for E-UTRA Physical Layer Aspects (Release 9)," Nov. 2009.
3GPP TS 36.212 V9.0.0, "Evolved Universal Terrestrial Radio Access (E-UTRA); Multiplexing and Channel Coding (Release 9)," Dec. 2009.
Potevio, "Proposal for an Enhanced SRS Scheme for CoMP," 3GPP TSG RAN WG1 #59bis, R1-100616, Jan. 2010.
Qualcomm Europe, "Uplink Channel Measurements in Neighboring Cells," 3GPP TSG-RAN WG2 #58is, R2-072601, Jun. 2007.
Huawei, "Consideration on CoMP for LTE-Advanced," 3GPP TSG RAN WG1 #54, R1-083049, Aug. 2008.
Nokia, "Reference Signal Structure for LTE-Advanced UL SU-MIMO," 3GPP TSG RAN WG1 #57, R1-091772, May 2009.
International Search Report issued for International Patent Application No. PCT/2011/058751 on Jun. 28, 2011.
International Preliminary Report on Patentability issued for International Patent Application No. PCT/JP2011/058751 on Dec. 20, 2011.

\* cited by examiner

US 8,588,833 B2

ASSIGNING AND COORDINATING UPLINK REFERENCE SIGNALS FOR COOPERATIVE COMMUNICATION

TECHNICAL FIELD

The present invention relates generally to wireless communications and wireless communications-related technology. More specifically, the present invention relates to assigning and coordinating uplink reference signals for cooperative communication.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of cells, each of which may be serviced by a base station. A base station may be a fixed station that communicates with mobile stations.

A wireless communication device may communicate with one or more base stations via transmissions on the uplink and the downlink. The uplink (or reverse link) refers to the communication link from the wireless communication device to the base station, and the downlink (or forward link) refers to the communication link from the base station to the wireless communication device. A wireless communication system may simultaneously support communication for multiple mobile stations.

Various signal processing techniques may be used in wireless communication systems to improve efficiency and quality of wireless communication. One such technique may include sending reference signals from a wireless communication device. Reference signals may be used to determine various operational parameters of the wireless communication system. Therefore, benefits may be realized by improved techniques for assigning and coordinating uplink reference signals.

DETAILED DESCRIPTION

Figure 1:
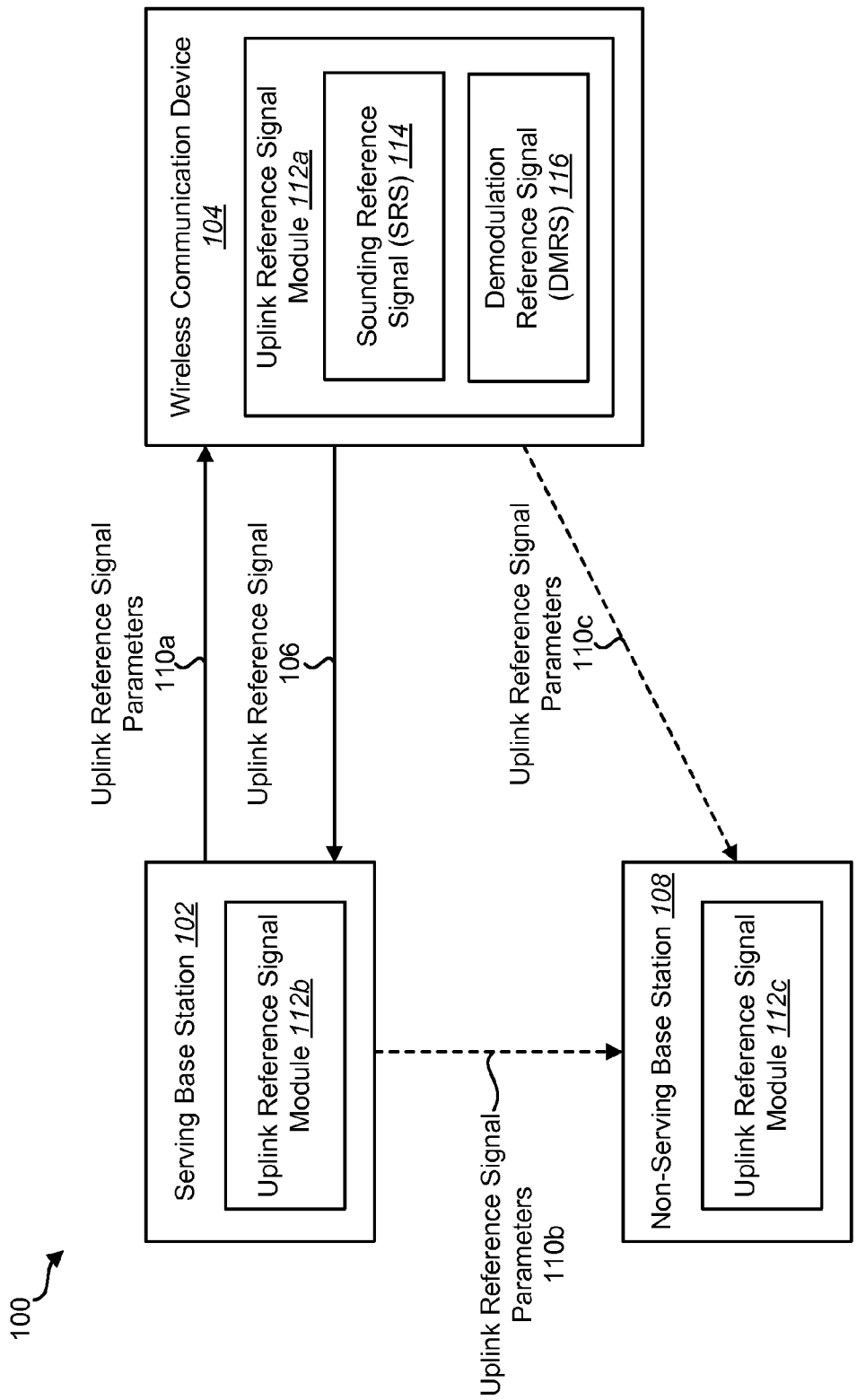
FIG. 1 is a block diagram illustrating a wireless communication system for assigning and coordinating uplink reference signals for cooperative communication.

A method for assigning and coordinating uplink reference signals for cooperative communication is disclosed. Data about an assigned uplink reference signal sequence used by a wireless communication device is received at a non-serving base station. An uplink reference signal estimate is determined based on the data. The uplink reference signal estimate is used to coherently demodulate a signal received from the wireless communication device or is used to estimate an uplink channel between the non-serving base station and the wireless communication device.

The method may include reserving a set of uplink reference signal sequences for coordinated reception by multiple base stations. The uplink reference signal sequences may be partitioned. An index may be assigned to each partition and the indexes may be known to the wireless communication device. The received data about an assigned uplink reference signal sequence may be an index of a partition that is going to be used for an uplink transmission from the wireless communication device. The partitioning may include grouping uplink reference signal sequences together that have a minimum cross correlation. The partitioning may also include determining a number of uplink reference signal sequences in a partition based on a number of available uplink spatial layers.

The data about an assigned uplink reference signal sequence may be received from a serving base station over a direct wired link, from a serving base station over a direct wireless link, or from a serving base station over a backbone network connection. The non-serving base station may be a home eNodeB. Alternatively, or in addition to, the data about an assigned uplink reference signal sequence may be received from a wireless communication device over a wireless link.

The data about an assigned uplink reference signal sequence may include first tier parameters, second tier parameters or irreducible parameters. The first tier parameters may include a group hopping pattern, a sequence-shift pattern, a pseudorandom sequence and a first cyclic shift and the first tier parameters may be used to determine second tier parameters. The second tier parameters may include a group number, a sequence index of the assigned uplink reference signal and a second cyclic shift. The irreducible parameters may include a physical cell identity, a sequence-shift increment, a first cyclic shift and a slot number.

The receiving may include receiving data about more then one assigned uplink reference signal sequence and the determining may include determining more than one uplink reference signal estimate based on the data. Furthermore, uplink reference signal sequences may be assigned in order to minimize a size of the data about the uplink reference signal sequences. The assigned uplink reference signal sequence may be a Sounding Reference Signal (SRS) or a Demodulation Reference Signal (DMRS).

A base station for assigning and coordinating uplink reference signals for cooperative communication is also disclosed. The base station includes a processor and memory in electronic communication with the processor. Executable instructions are stored in the memory. The instructions are executable to receive, at a non-serving base station, data about an assigned uplink reference signal sequence used by a wireless communication device. The instructions are also executable to determine an uplink reference signal estimate based on the data. The instructions are also executable to use the uplink reference signal estimate to coherently demodulate a signal received from the wireless communication device or to estimate an uplink channel between the non-serving base station and the wireless communication device.

A computer-readable medium that includes executable instructions for assigning and coordinating uplink reference signals for cooperative communication is also disclosed. The instructions are executable for receiving, at a non-serving base station, data about an assigned uplink reference signal sequence used by a wireless communication device. The instructions are also executable for determining an uplink reference signal estimate based on the data. The instructions are also executable for using the uplink reference signal estimate to coherently demodulate a signal received from the wireless communication device or to estimate an uplink channel between the non-serving base station and the wireless communication device.

FIG. 1 is a block diagram illustrating a wireless communication system 100 for assigning and coordinating uplink reference signals 106 for cooperative communication. The system 100 may include one or more base stations 102, 108 and one or more wireless communication devices 104. A base station 102, 108 may be referred to as an access point, a Node B, an eNodeB or some other terminology. Likewise, a wireless communication device 104 may be referred to as a mobile station, a subscriber station, an access terminal, a remote station, a user terminal, a terminal, a handset, a subscriber unit, user equipment or some other terminology.

In the system 100, a wireless communication device 104 may receive information regarding security, authentication, mobility management and connection maintenance from a base station 102, known as a "serving cell" or "serving base station" in the 3$^{rd}$ Generation Partnership Project (3GPP) cellular communication standard known as Long Term Evolution (LTE). This may include using one or more downlink carriers, e.g., using multiple Orthogonal Frequency Division Multiplexing (OFDM) carriers. The serving base station 102 may also set and define uplink transmission parameters, such as a Sounding Reference Signal (SRS) 114 that may be used for estimating the uplink channel and a Demodulation Reference Signal (DMRS) 116 that may be used for coherent demodulation of uplink transmissions. Specifically, the serving base station 102 may send uplink reference signal parameters 110a to the wireless communication device 104, which may determine one or more uplink reference signals 106. The wireless communication device 104 may include an uplink reference signal module 112a to determine a Sounding Reference Signal (SRS) 114 or a Demodulation Reference Signal (DMRS) 116. The serving base station 102 and non-serving base station 108 may also include uplink reference signal modules 112b-c.

Advanced cooperative techniques in the uplink are provisioned in LTE Release 10 and future releases of 3GPP standards, i.e., techniques in which a neighboring (non-serving) base station 108 may cooperate with the serving base station 102. However, algorithms such as cooperative scheduling of traffic by base stations (e.g., eNodeBs) for managing interference, or multi-point reception may require that neighboring (non-serving) base stations 108 be able to measure the uplink channel. This may require that the neighboring (non-serving) base stations 108 be informed of the uplink reference signals 106 used by the wireless communication device 104, e.g., a Sounding Reference Signal (SRS) 114. The information about the uplink reference signal 106 used by wireless communication device 104 may not available at the neighboring (non-serving) base stations 108. Therefore, the present systems and methods may share the information about the Sounding Reference Signal(s) 114 or Demodulation Reference Signal(s) 116 used by the wireless communication device 104 with the neighboring (non-serving) base stations 108.

In one configuration of the system 100, the wireless communication device 104 is a User Equipment (UE) and the base stations 102, 108 are eNodeBs (eNBs). The system 100 may set aside a set of reference signal sequences for coordinated reception by multiple base stations 102, 108. The system 100 may also partition the reference signals into different groups, with an index assigned to each partition. The partitioning and indexing may be known to all eNBs and UEs. The index of the partition that is going to be used in transmission may be transmitted to the UE and cooperating eNBs. One method that may be used for partitioning is to group sequences with minimum cross correlation. The number of sequences in a partition may be determined by the number of available uplink spatial layers.

The system 100 may also use methods for coordinating the information regarding the uplink reference signal 106 to the UE via the direct wired link, such as X2, between the serving cell and neighboring base stations. In other words, the uplink reference signal parameters 110b may be sent from the serving base station 102 to the non-serving base station 108. Similarly, the system 100 may also use methods for coordinating the information regarding the uplink assigned reference signal 106 to a UE via a direct wireless link, such as wireless XS, between the serving base station 102 and neighboring base stations 108 or relays. The system 100 may also use methods for coordinating the information regarding the uplink assigned reference signal 106 to a UE via a backbone network connection, between the serving base station and neighboring home eNodeBs (HeNBs).

The information about the reference signal 106 may be shared by neighboring cells via a UE-eNB wireless link, i.e., the uplink reference signal parameters 110c may be sent from the wireless communication device 104 to the non-serving base station 108. The information that may be shared amongst the base stations (or relays/HeNBs) in order to obtain the uplink reference signal 106 used by the UE. Such information may be the actual reference signal 106 group and sequence index allocated to a UE. Such information may also be intermediary parameters from which the group and sequence number of the SRS allocated to a UE can be computed. Such information may also be primary parameters by which the neighboring base stations (or relays/HeNBs) can compute the group and sequence number of the reference signal 106 assigned to a UE. If more than one sequence is assigned to a UE, the present systems and methods may be applied to all sequences. If more than one sequence is assigned to a UE, the methods may be optimized such that the minimum amount of information needed for computing the SRS may be shared and communicated. The uplink reference signals 106 may be Sounding Reference Signals (SRS) 114 or Demodulation reference signals (DMRS) 116.

Figure 2:
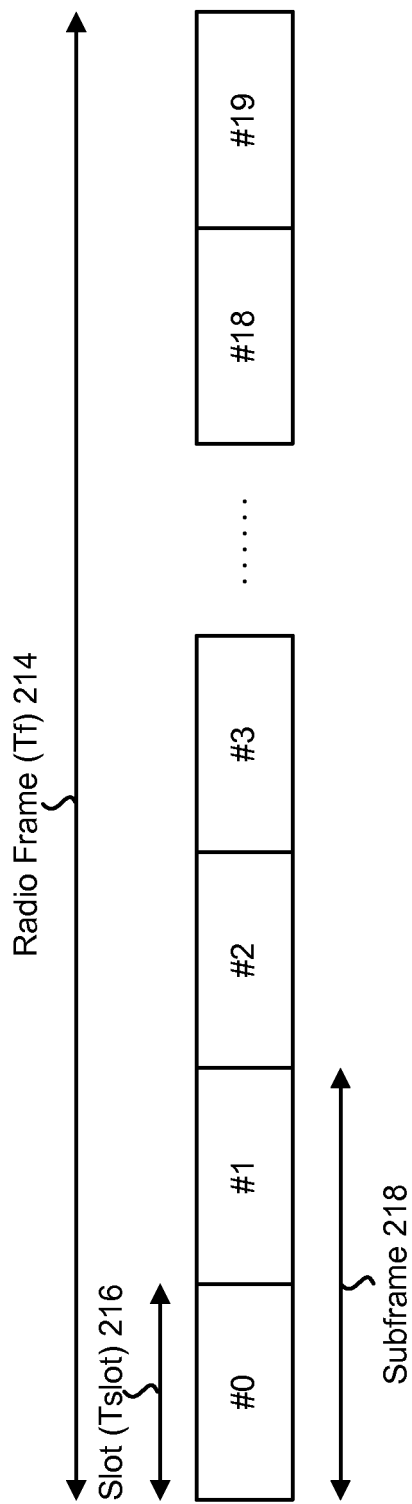
FIG. 2 is a block diagram illustrating a radio frame.

FIG. 2 is a block diagram illustrating a radio frame 214. The wireless communication system 100 illustrated in FIG. 1 may operate on a frame 214 basis. Each frame 214 may include multiple subframes 218 that each may include one or more slots 216. The following are examples of possible values for lengths of data in the system 100, although other values may be used:

1. $T_s = 1/(15000 \times 2048)$ seconds
2. $T_f = 307200 \cdot T_s = 10$ ms=1 radio frame
3. $T_{slot} = 15360 \cdot T_s = 0.5$ ms, numbered from 0 to 19 in each radio frame where $T_s$ is the smallest unit of time measured, $T_f$ is the length of a radio frame 214 in terms of $T_s$, and $T_{slot}$ is the length of a slot 216 in terms of $T_s$.

Figure 3:
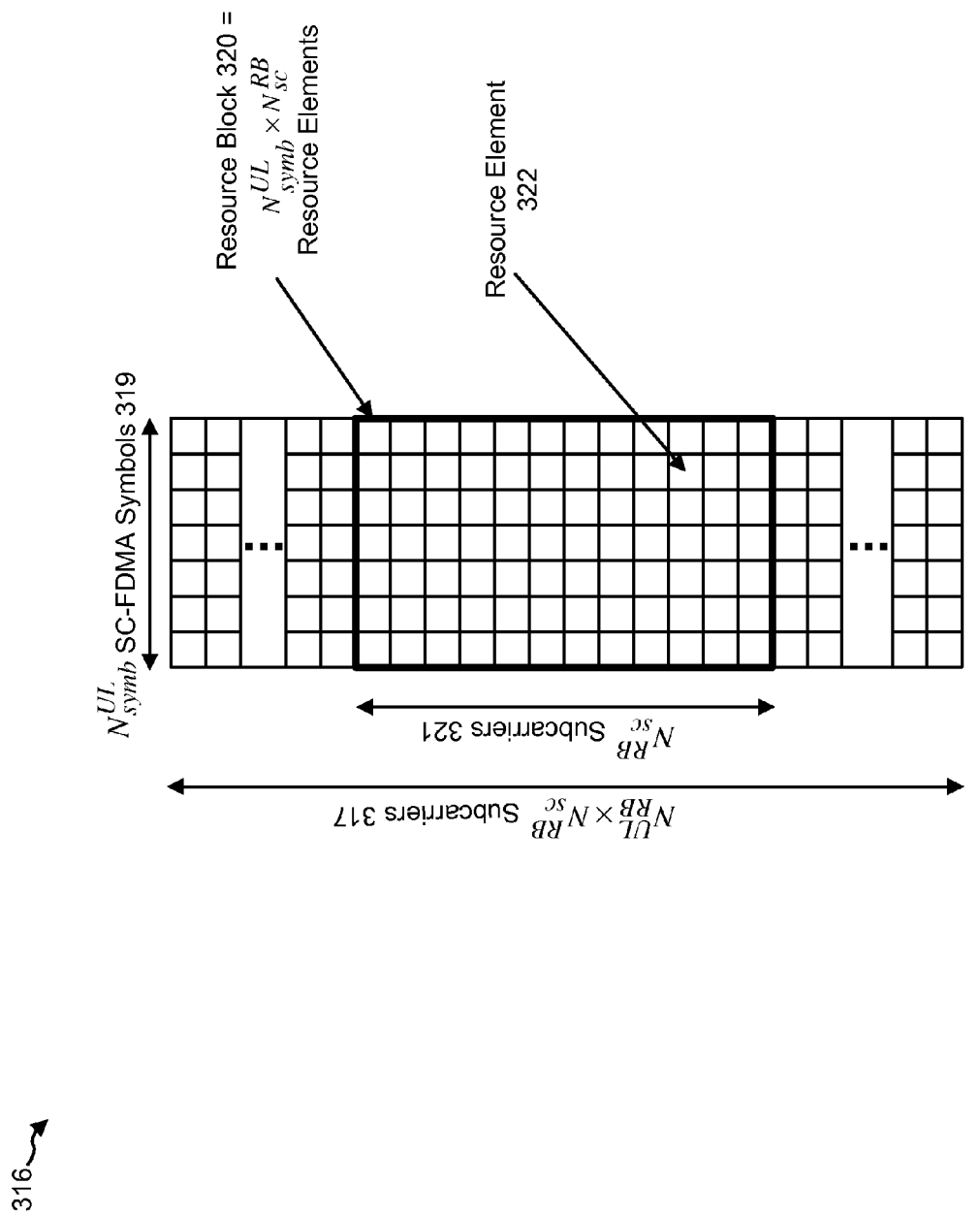
FIG. 3 is a block diagram illustrating a slot.

FIG. 3 is a block diagram illustrating a slot 316. Each slot 316 may include $N_{RB}^{UL} N_{sc}^{RB}$ subcarriers 317 and $N_{symb}^{UL}$ SC-FDMA symbols 319 when $N_{RB}^{UL}$ resource blocks are allocated. A physical resource block 320 in the uplink may include $N_{symb}^{UL} \times N_{sc}^{RB}$ resource elements 322, and may correspond to one slot 316 in the time domain and 180 kHz in the frequency domain. The number of subcarriers in a resource block ($N_{sc}^{RB}$) 321, and the number of symbols in a slot ($N_{symb}^{UL}$) 319 may be defined in Table 1.

TABLE 1

| Configuration | $N_{sc}^{RB}$ | $N_{symb}^{UL}$ |
|---|---|---|
| Normal cyclic prefix | 12 | 7 |
| Extended cyclic prefix | 12 | 6 |

Figure 4:
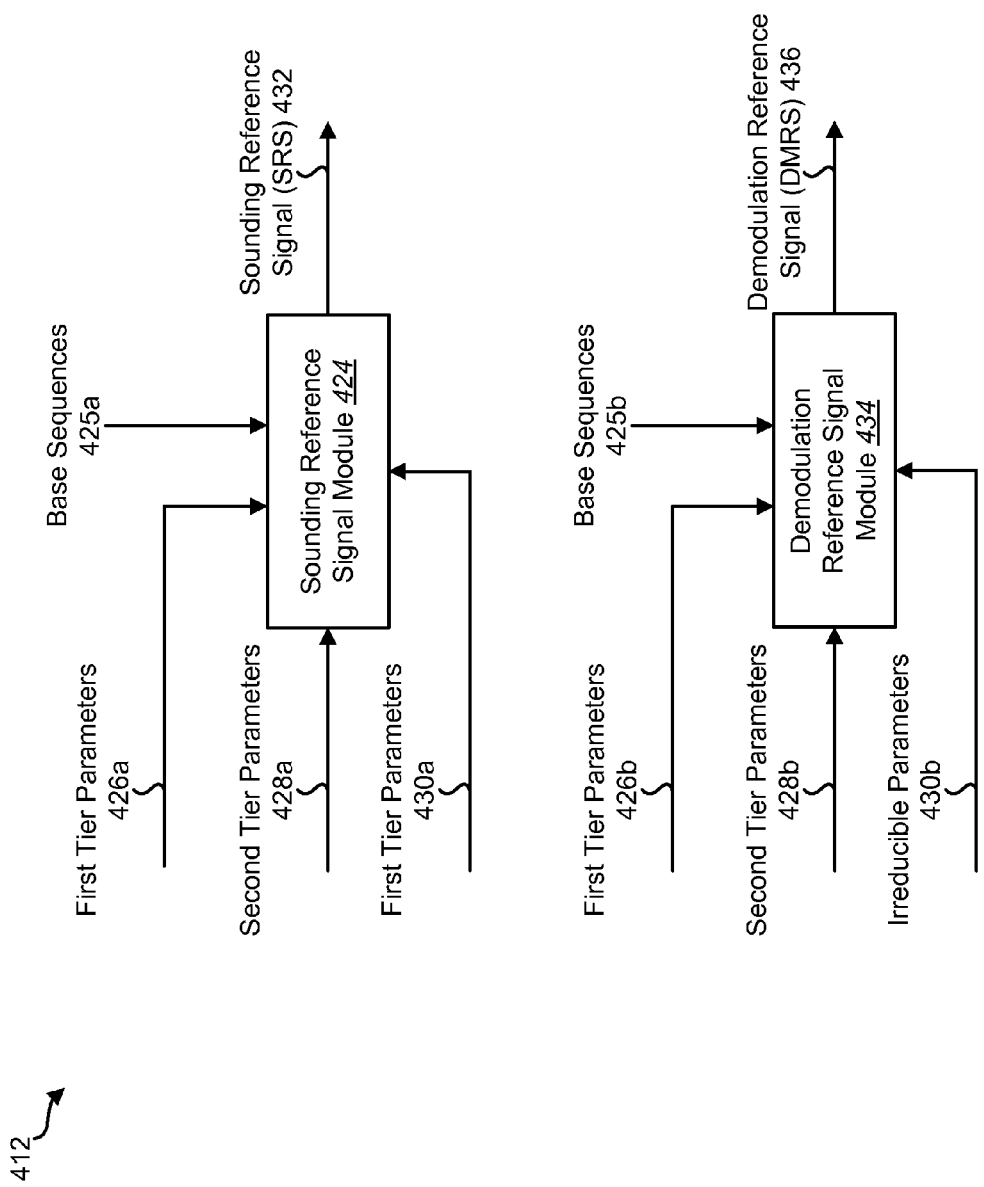
FIG. 4 is a block diagram of an uplink reference signal module.

FIG. 4 is a block diagram of an uplink reference signal module 412. The uplink reference signal module 412 may include a sounding reference signal module 424 and a demodulation reference signal module 434. The sounding reference signal module 424 may produce a Sounding Reference Signal (SRS) 432 using a set of base sequences 425a and one or more of a set of first tier parameters 426a, a set of second tier parameters 428a or a set of irreducible parameters 430a. The SRS 432 may be used by a base station to estimate an uplink channel. Similarly, the demodulation reference signal module 434 may produce a Demodulation Reference Signal (DMRS) 436 using a set of base sequences 425b and one or more of a set of first tier parameters 426b, a set of second tier parameters 428b, or a set of irreducible parameters 430b. The DMRS 436 may be used to demodulate uplink data.

Figure 5:
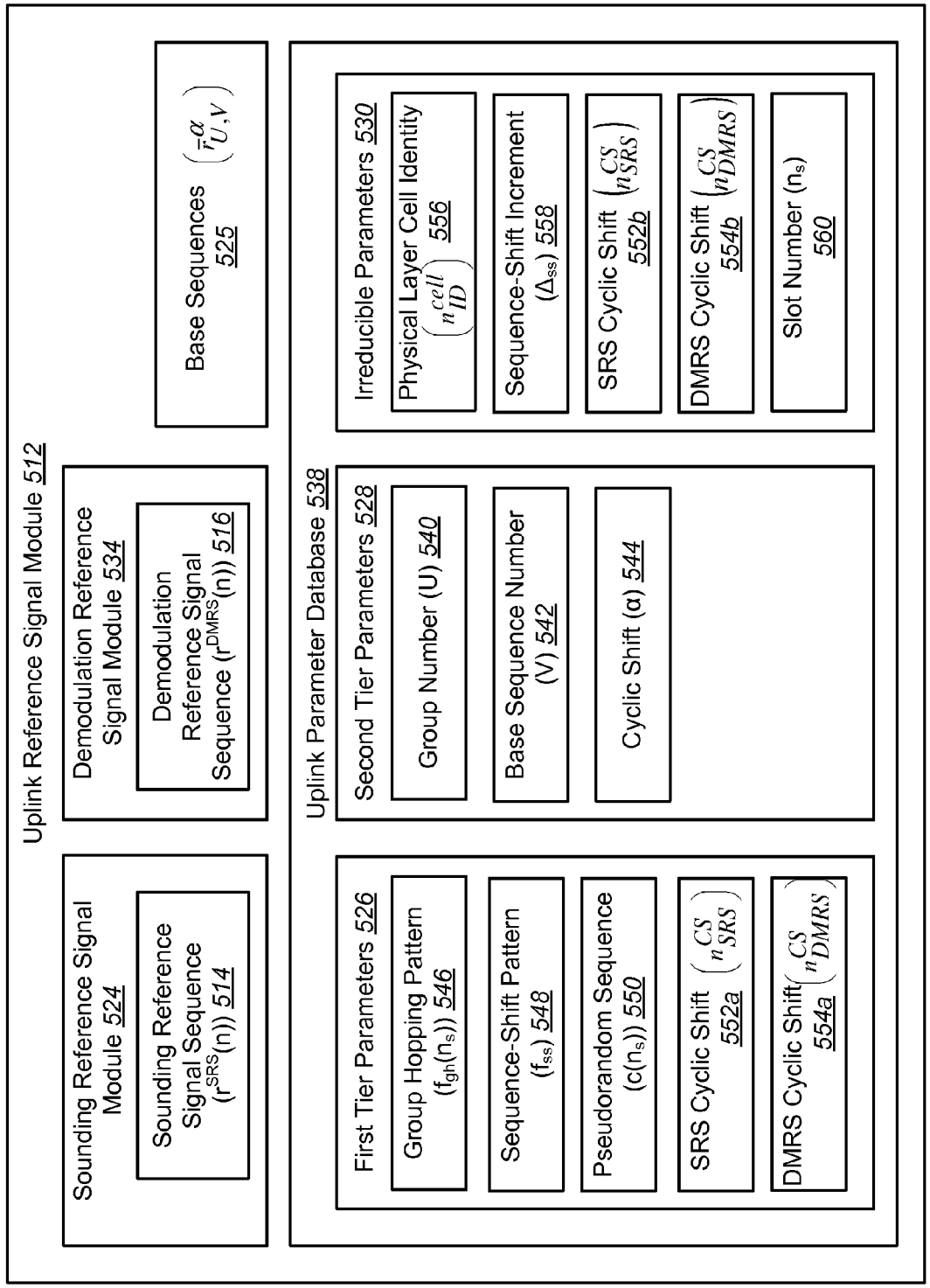
FIG. 5 is a block diagram illustrating an uplink reference signal module.

FIG. 5 is a block diagram illustrating an uplink reference signal module 512. The uplink reference signal module 512 may be in a wireless communication device 104 or a base station 102, 108 and may include a sounding reference signal module 524 and a demodulation reference signal module 534. The sounding reference signal module 524 may produce a Sounding Reference Signal sequence ($r^{SRS}(n)$) 514 and the demodulation reference signal module 534 may produce a Demodulation Reference Signal sequence ($r^{DMRS}(n)$) 516. These modules may use a set of base sequences ($\bar{r}_{U,V}^{\alpha}$) 525 and one or more of a set of first tier parameters 526, a set of second tier parameters 528, or a set of irreducible parameters 530. In other words, the uplink reference signal module 512 uses knowledge of one of these categories, in addition to the set of base sequences ($\bar{r}_{U,V}^{\alpha}$) 525, to compute an SRS 514 or DMRS 516.

The parameters used to determine the reference signal(s) may be stored in an uplink parameter database 538. The first tier parameters 526 may include a group hopping pattern ($f_{gh}(n_s)$) 546, a sequence-shift pattern ($f_{ss}$) 548, a pseudorandom sequence ($c(n_s)$) 550, and an SRS cyclic shift ($n_{SRS}^{CS}$) 552a (or a DMRS cyclic shift ($n_{DMRS}^{CS}$) 554a for a DMRS). Alternatively, instead of including an SRS cyclic shift ($n_{SRS}^{CS}$) 552a (or a DMRS cyclic shift ($n_{DMRS}^{CS}$) 554a) to determine a cyclic shift ($\alpha$) 544, the second tier parameters 528 may include a cyclic shift ($\alpha$) 544.

The second tier parameters 528 may include a group number (U) 540, a base sequence number (V) 542, and a cyclic shift ($\alpha$) 544. In one configuration, the set of base sequences ($\bar{r}_{U,V}^{\alpha}$) 525 may be partitioned, with an index assigned to each partition. In this configuration, the group number (U) 540 may be the index to the assigned partition and the base sequence number (V) 542 may be the index within the partition. Therefore, the SRS module 524 or DMRS module 534 may identify one of the base sequences ($\bar{r}_{U,V}^{\alpha}$) 525 using U 540 and V 542 and then apply a cyclic shift ($\alpha$) 544. The irreducible parameters 530 may include a physical layer cell identity ($n_{ID}^{cell}$) 556, a sequence shift increment ($\Delta_{ss}$) 558, an SRS cyclic shift ($n_{SRS}^{CS}$) 552b (or a DMRS cyclic shift ($n_{DMRS}^{CS}$) 554b) and a slot number ($n_s$) 560.

Figure 6:
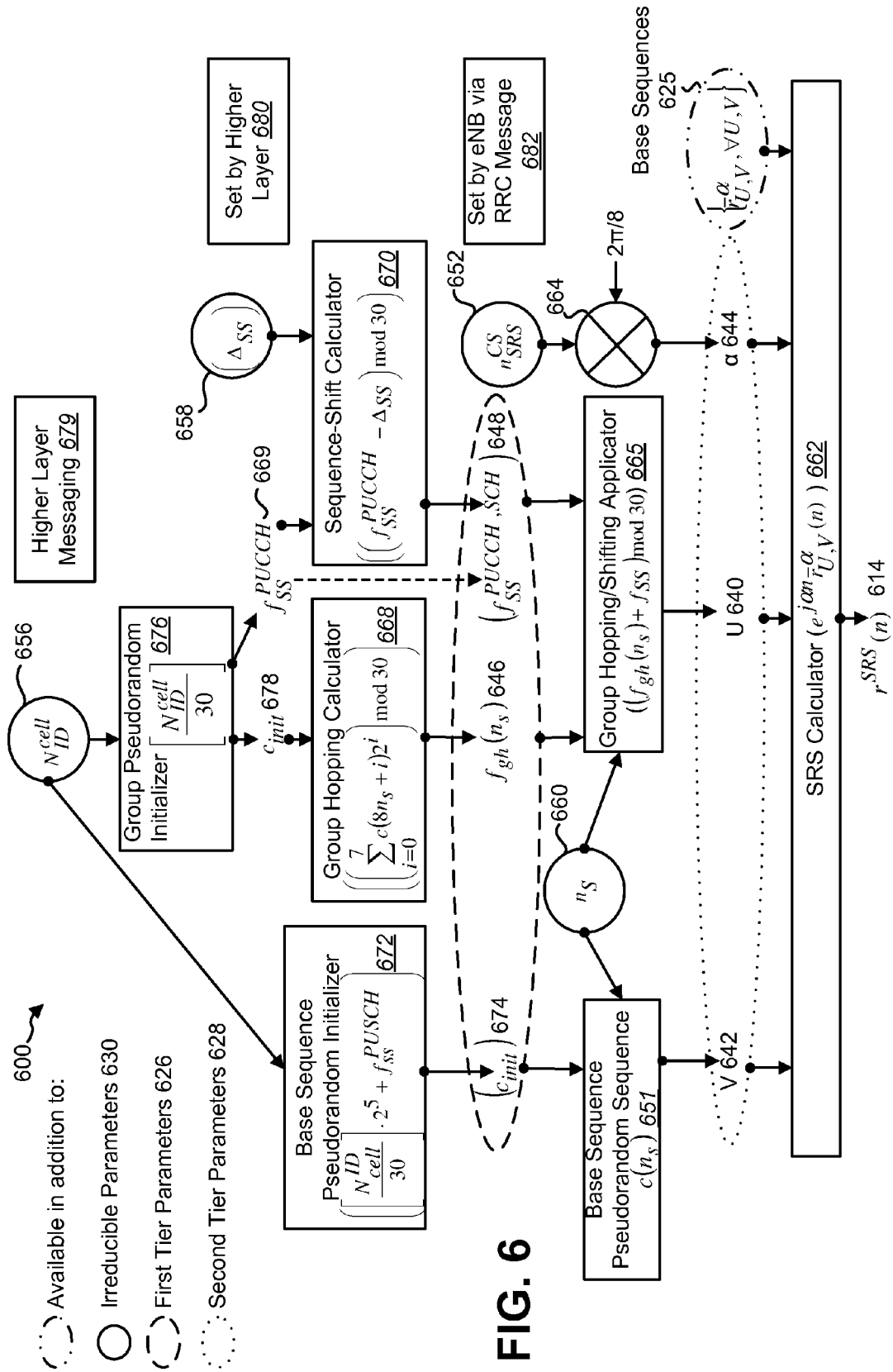
FIG. 6 is a flow diagram illustrating the functional relationship between uplink reference signal parameters.

FIG. 6 is a flow diagram 600 illustrating the functional relationship between uplink reference signal parameters. The various modules may be in an uplink reference signal module 512 in a base station 102, 108 or a wireless communication system 104. In one configuration, a sounding reference signal module 524 may determine a Sounding Reference Signal sequence ($r^{SRS}(n)$) 614. However, the flow diagram 600 may be modified to produce a Demodulation Reference Signal sequence ($r^{DMRS}(n)$) 516.

In LTE, the Sounding Reference Signal sequence ($r^{SRS}(n)$) 614 may be defined according to Equation (1):

$$r^{SRS}(n) = r_{U,V}^{\alpha}(n) = e^{j\alpha n}\bar{r}_{U,V}^{\alpha}(n) \qquad (1)$$

where $\bar{r}_{U,V}^{\alpha}$ is a set of base sequences 625, U is the group number 640, V is the sequence number 642, and $\alpha$ is a cyclic shift 644. In other words, an SRS calculator 662 may use second tier parameters 628 to calculate the Sounding Reference Signal sequence ($r^{SRS}(n)$) 614 according to Equation (1). The cyclic shift may be determined using a multiplier 664 according to Equation (2):

$$\alpha = \frac{2\pi}{8} n_{SRS}^{CS} \qquad (2)$$

where $n_{SRS}^{CS}$ is an SRS cyclic shift 652 defined in the 3GPP LTE specification. The value of $n_{SRS}^{CS}$ 652 may be set by a serving base station (e.g., eNB) and transmitted to a wireless communication device (e.g., UE) via a Radio Resource Control (RRC) message 682. Alternatively, if a Demodulation Reference Signal sequence ($r^{DMRS}(n)$) 516 was produced, a DMRS cyclic shift ($n_{DMRS}^{CS}$) 554 may be used instead of the SRS cyclic shift ($n_{SRS}^{CS}$) 652.

Group hopping and sequence-shifting, for time slot $n_s$ 660 where $0 \leq n_s \leq 19$, may be performed in a group hopping/shifting applicator 665 according to Equation (3):

$$U = (f_{gh}(n_s) + f_{ss}) \bmod 30 \qquad (3)$$

where $f_{gh}(n_s)$ is the group-hopping pattern 646 for time slot $n_s$ 660, and may be determined by a group hopping calculator 668 according to Equation (4):

$$f_{gh}(n_s) = \begin{cases} 0 \bmod 30 \\ \left(\sum_{i=0}^{7} c(8n_s + i) \cdot 2^i\right) \bmod 30 \end{cases} \qquad (4)$$

where $c(\cdot)$ is a pseudorandom sequence generator that may be initialized by initial value ($c_{init}$) 678 at the beginning of each radio frame. This initial value ($c_{init}$) 678 may be produced by a group pseudorandom initializer 676 according to Equation (5):

$$c_{init} = \left\lfloor \frac{N_{cell}^{ID}}{30} \right\rfloor \qquad (5)$$

where $N_{cell}^{ID}$ is the physical layer cell identity 656 that may be set by higher layer messaging 679. In other words, the group pseudorandom initializer 676 may produce an initial value ($c_{init}$) 678 to be used in determining the group number (U) 640. Furthermore, $f_{ss}$ may be a sequence-shift pattern 648 determined partially by a sequence-shift calculator 670 according to Equation (6):

$$f_{SS} : \begin{cases} f_{SS}^{PUCCH} = N_{ID}^{cell} \bmod 30 \\ f_{SS}^{PUSCH} = (f_{SS}^{PUCCH} + \Delta_{SS}) \bmod 30 \end{cases} \quad (6)$$

where $f_{ss}^{PUCCH}$ 669 is a sequence-shift pattern for a Physical Uplink Control Channel (PUCCH), $f_{ss}^{PUCCH}$ is a sequence-shift pattern for a Physical Uplink Shared Channel (PUSCH) and $\Delta_{ss}$ is a sequence shift increment 658 that may be configured by higher layers 680.

The base sequence number (V) 642 may be given according to Equation (7):

$$V = c(n_s) \quad (7)$$

if group hopping is disabled and sequence hopping is enabled. Otherwise (if group hopping is enabled or sequence hopping is disabled), V 642 may be 0. A base sequence pseudo-random sequence $c(n_s)$ 651 may be initialized with an initial value ($c_{init}$) 674. This initial value ($c_{init}$) 674 may be produced by a base sequence pseudorandom initializer 672 according to Equation (8):

$$C_{init} = \left[\frac{N_{cell}^{ID}}{30}\right] \cdot 2^5 + f_{SS}^{PUSCH} \quad (8)$$

In other words, the base sequence pseudorandom initializer 672 may produce $c_{init}$ 674 to be used in determining the base sequence number (V) 642.

There may be a single module that generates random numbers or pseudo random numbers. In order to get different and somewhat independent samples, the pseudorandom algorithm(s) may be initialized with different values. Therefore, the modules that generate pseudo random numbers (c(•) to calculate V 642 and $f_{gh}(n_s)$ 646) may be the same function initiated differently. Alternatively, the pseudorandom modules may be different at the cost of a more complex implementation.

Therefore, in one configuration, an uplink reference signal module 512 uses a set of base sequences ($\bar{r}_{U,V}^{\alpha}$) 625, and the first tier parameters 626 ($f_{gh}(n_s)$, $f_{ss}$, $c(n_s)$, and $n_{SRS}^{CS}/n_{DMRS}^{CS}$ (or $\alpha$)), the second tier parameters 628 (U, V, and $\alpha$ with Equation (1)), or the irreducible parameters 630 ($n_{ID}^{cell}$, $\Delta_{ss}$, $n_{SRS}^{CS}/n_{DMRS}^{CS}$, and $n_s$) to determine the Sounding Reference Signal Sequence ($r^{SRS}$(n)) 614.

The functional relationship among the first tier parameters 626, second tier parameters 628, and irreducible parameters 630 may not be reversible because of the interdependency of the parameters with pseudorandom sequence c(•) In other words, knowing the value $c(n_s)$ may not lead to obtaining $n_s$. The type of parameters (first tier 626, second tier 628, or irreducible 630) shared with a non-serving base station 108 may be affected by considerations such as security. For example, higher layer parameters, such as irreducible parameters 630 ($n_{ID}^{cell}$, $\Delta_{ss}$, $n_{SRS}^{CS}/n_{DMRS}^{CS}$, and $n_s$) may be used in other procedures in a cell which might not be desirable to be known to other cells from different operators. In this case directly sharing the values of second tier parameters 628 (U, V, and $\alpha$) may more desirable.

A wireless communication device 104 may be equipped with multiple antennas that may be used for uplink transmission. In this case, the wireless communication device 104 may use different SRS sequences ($r^{SRS}$(n)) 614 on each of the available uplink spatial dimensions. The procedure by which the uplink SRS sequences ($r^{SRS}$(n)) 614 are selected may be known to all the neighboring (non-serving) base stations 108.

Therefore it may be sufficient that the serving base station 102 shares the required selection parameters with the neighboring (non-serving) base stations 108.

For example, one way of selecting the uplink reference signal sequences ($r^{SRS}$(n)) 614 is to partition the set of base sequences 625 and identify each partition with an index. Furthermore, the partitioning may be done based on a measure such as cross correlation, e.g., base sequences 625 that have the smallest cross correlation with each other may be placed in the same group. The number of base sequences 625 in a partition may be determined by the number of available spatial layers (dimensions) in the uplink. The partitions may be indexed and the partitions and indices may be known to all base stations 102, 108 and wireless communication devices 104. The serving base station 102 may assign a partition to a wireless communication device 104 and send the index of the partition to the wireless communication device 104. The index of the partition may also be shared with the neighboring (non-serving) base stations 108 directly via an X2 link between the serving base station 102 and the non-serving base station 108. Alternatively, the index of the partition may be shared with the non-serving base station 108 indirectly via wireless communication device 104.

In order to select a reference signal, parameters U 642, V 640 and $\alpha$ 644 may be applied to only one of the base sequences 625. Therefore, in addition to knowing one of the categories of data (irreducible parameters 630, first tier parameters 626 or second tier parameters 628), neighboring base stations may be informed about the base sequences 625 that are used for selecting reference signals.

Figure 7:
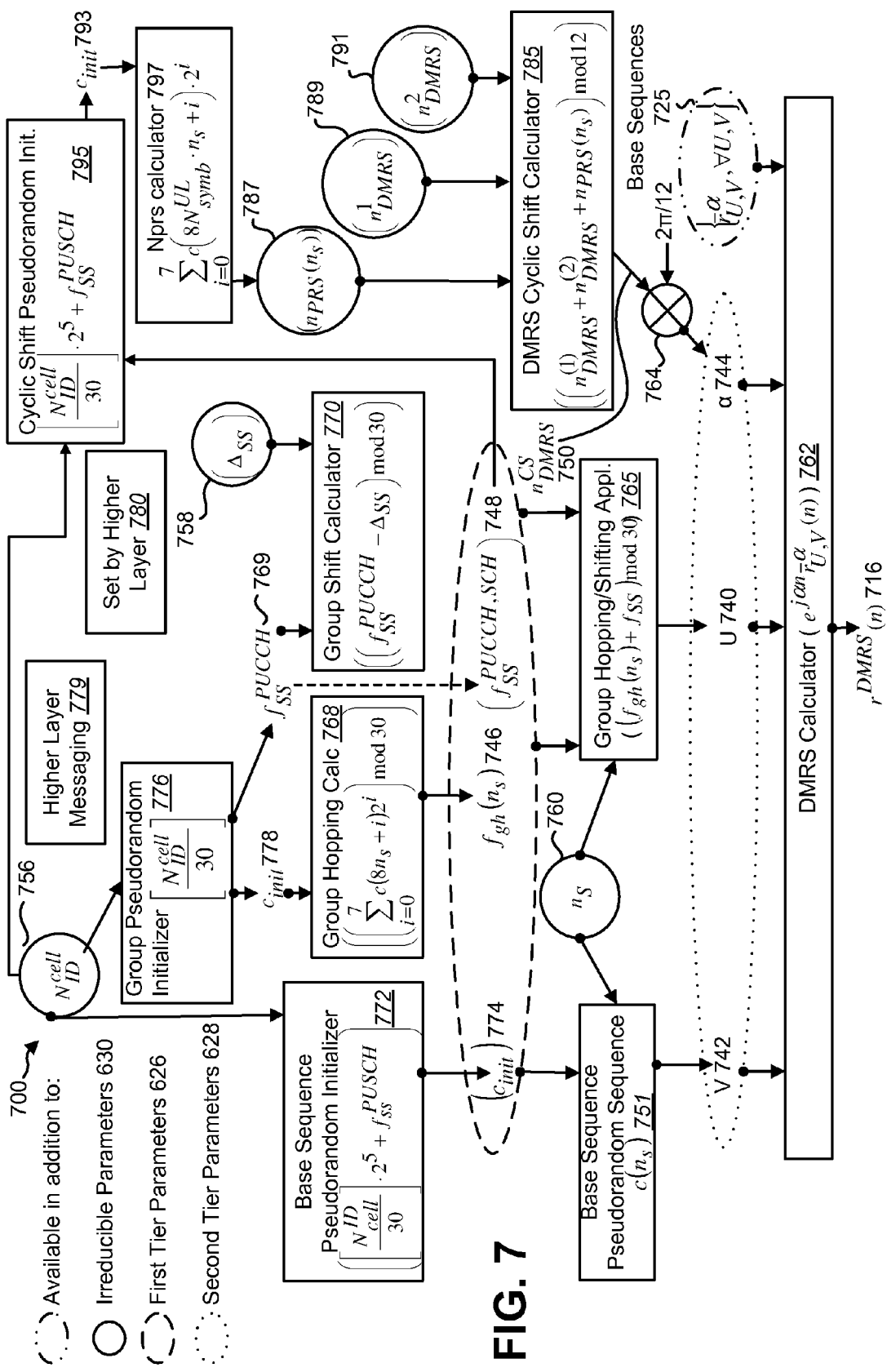
FIG. 7 is a flow diagram illustrating the functional relationship between uplink reference signal parameters.

FIG. 7 is a flow diagram 700 illustrating the functional relationship between uplink reference signal parameters. The various modules may be in an uplink reference signal module 512 in a base station 102, 108 or a wireless communication system 104. In one configuration, a demodulation reference signal module 534 may determine a Demodulation Reference Signal sequence ($r^{DMRS}$(n)) 716. Unless otherwise noted, the flow diagram 700 elements in FIG. 7 may operate similarly to the flow diagram elements 600 in FIG. 6. In other words, elements 725, 726, 728, 730, 740, 742, 744, 746, 748, 751, 756, 758, 760, 764, 765, 768, 769, 770, 772, 774, 776, 778, 779 and 780 in FIG. 7 may correspond to elements 625, 626, 628, 630, 640, 642, 644, 646, 648, 651, 656, 658, 660, 664, 665, 668, 669, 670, 672, 674, 676, 678, 679 and 680 in FIG. 6.

Therefore, the flow diagram 700 may represent the functional dependency of the parameters for generating Demodulation Reference Signals (DMRS), i.e., a DMRS calculator 762 may produce a Demodulation Reference Sequence ($r^{DMRS}$(n)) 716. In the flow diagram 700 of FIG. 7, however, the DMRS cyclic shift ($n_{DMRS}^{CS}$) 750 may be calculated by a DMRS cyclic shift calculator 785 according to Equation (9):

$$n_{DMRS}^{CS} = (n_{DMRS}^{(1)} + n_{DMRS}^{(2)} + n_{PRS}(n_s)) \bmod 12 \quad (9)$$

where the values of $n_{DMRS}^{(1)}$ 789 are given by Table 2. The parameter cyclicShift may be provided by higher layers.

TABLE 2

| Mapping of cyclicShift to $n_{DMRS}^{(1)}$ | |
|---|---|
| cyclicShift | $n_{DMRS}^{(1)}$ |
| 0 | 0 |
| 1 | 2 |
| 2 | 3 |
| 3 | 4 |
| 4 | 6 |

TABLE 2-continued

Mapping of cyclicShift to $n_{DMRS}^{(1)}$

| cyclicShift | $n_{DMRS}^{(1)}$ |
|---|---|
| 5 | 8 |
| 6 | 9 |
| 7 | 10 |

The value of $n_{DMRS}^{(2)}$ 791 in Equation (9) may be given by the cyclic shift for the DMRS field in the most recent downlink control information DCI format 0. The value of $n_{PRS}(n_s)$ 787 in Equation (9) may be calculated by an Nprs calculator 797 according to Equation (10):

$$n_{PRS} = \sum_{i=0}^{7} C(8N_{symb}^{UL} \cdot n_S + i) \cdot 2^i \qquad (10)$$

where the pseudo-random sequence c(i) is initialized with an initialization value $c_{init}$ 793, produced by a cyclic shift pseudorandom initializer 795 according to Equation (11) at the beginning of each radio frame:

$$C_{init} = \left\lfloor \frac{N_{ID}^{Cell}}{30} \right\rfloor \cdot 2^5 + f_{SS}^{PUSCH} \qquad (11)$$

There may be a single module that generates random numbers or pseudo random numbers. In order to get different and somewhat independent samples, the pseudorandom algorithm(s) may be initialized with different values. Therefore, the modules that generate pseudo random numbers (c(•) to calculate V 742, $f_{gh}(n_s)$ 746 and $n_{prs}(n_s)$ 787) may be the same function initiated differently. Alternatively, the pseudorandom modules may be different at the cost of a more complex implementation.

Figure 8:
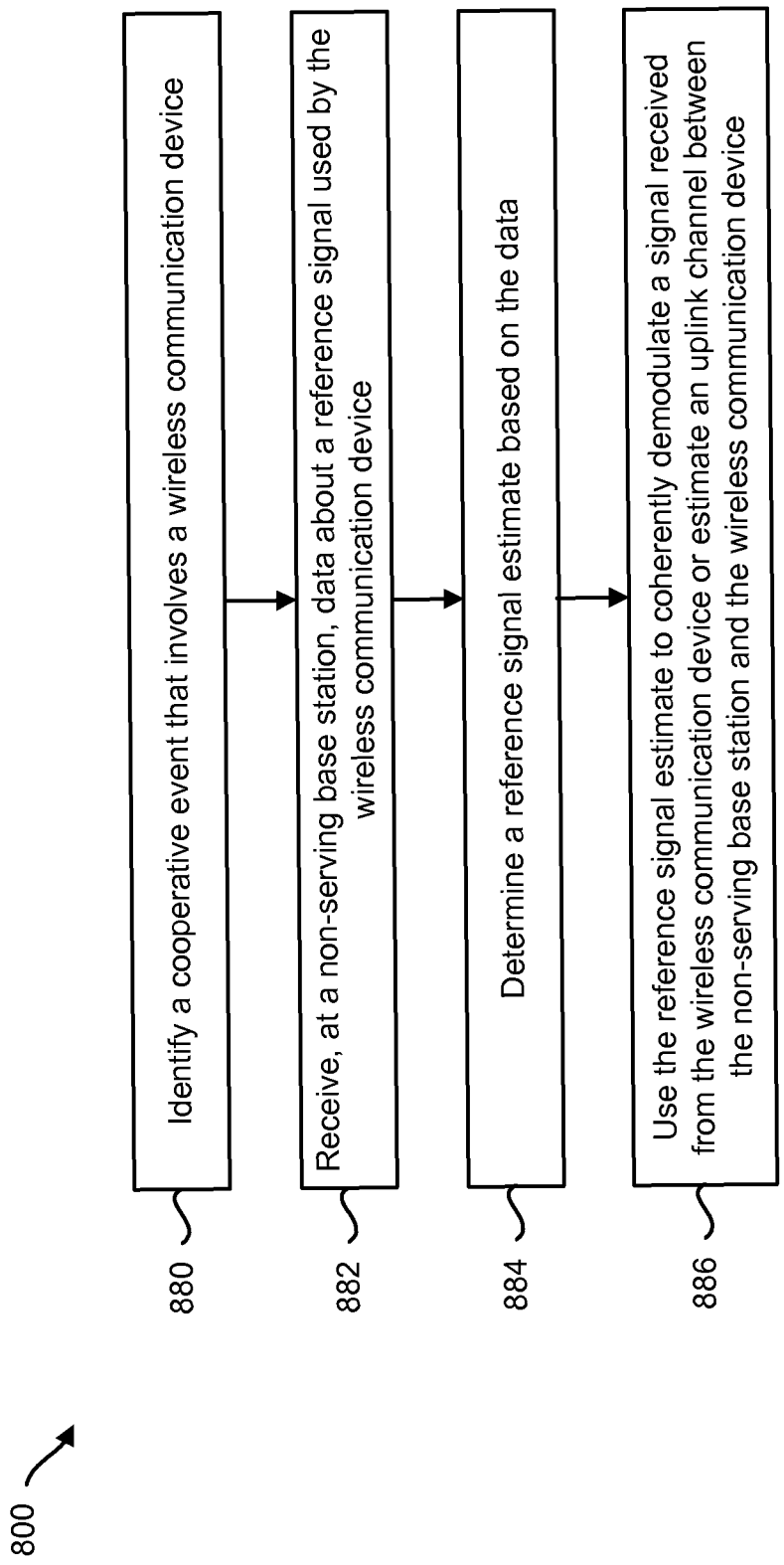
FIG. 8 is a flow diagram illustrating a method for assigning and coordinating uplink reference signals for cooperative communication.

FIG. 8 is a flow diagram illustrating a method 800 for assigning and coordinating uplink reference signals for cooperative communication. The method 800 may be performed in a non-serving base station 108. The non-serving base station 108 may identify 880 a cooperative event that involves a wireless communication device 104. The cooperative event may be an advanced technique in LTE, e.g., cooperative scheduling of traffic to manage interference or multi-point reception. In order to participate in this cooperative event, the non-serving base station 108 may measure an uplink channel for the wireless communication device 104 (that it is not serving). However, without data relating to the reference signal used by the wireless communication device 104, the non-serving base station 108 may not be able to measure the uplink channel (or demodulate uplink data correctly). Therefore, the non-serving base station 108 may receive 882 data about a reference signal used by the wireless communication device 104.

In one configuration, the data may comprise one of the following types of data: first tier parameters 526, second tier parameters 528, and irreducible parameters 530. The non-serving base station 108 may have knowledge of the base sequences 525 and may only receive the first tier parameters 526, second tier parameters 528 or irreducible parameters 530. First tier parameters 526 may be used to determine second tier parameters 528, i.e., the group number (U) 540, base sequence number (V) 542 and cyclic shift (α) 544 may be determined from first tier parameters 526. The data may be received from a serving base station 102, e.g., via an X2 link. Alternatively, the data may be received from the serving base station 102 via the wireless communication device using a wireless link, e.g., wireless XS. The non-serving base station 108 may also determine 884 a reference signal estimate based on the data. The non-serving base station 108 may also use 886 the reference signal estimate to coherently demodulate a signal received from the wireless communication device 104 (if the reference signal is a DMRS) or estimate an uplink channel between the non-serving base station 108 and the wireless communication device 104 (if the reference signal is an SRS).

Figure 9:
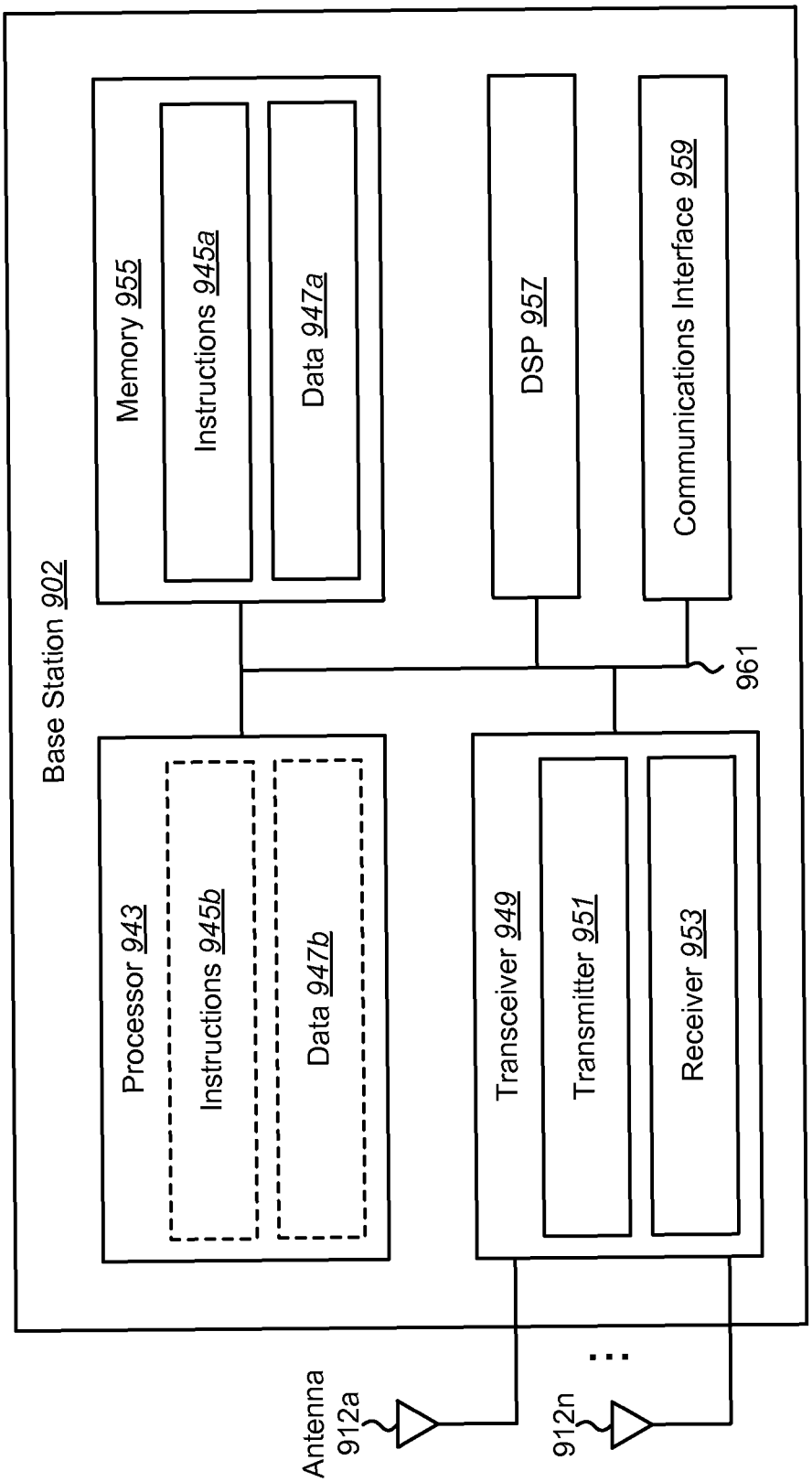
FIG. 9 illustrates various components that may be utilized in a base station.

FIG. 9 illustrates various components that may be utilized in a base station 902. The base station 902 may be utilized as the serving base station 102 or the non-serving base station 108 in FIG. 1. The base station 902 includes a processor 943 that controls operation of the base station 902. The processor 943 may also be referred to as a CPU. Memory 955, which may include both read-only memory (ROM), random access memory (RAM) or any type of device that may store information, provides instructions 945a and data 947a to the processor 943. A portion of the memory 955 may also include non-volatile random access memory (NVRAM). Instructions 945b and data 947b may also reside in the processor 943. Instructions 945b loaded into the processor 943 may also include instructions 945a from memory 955 that were loaded for execution by the processor 943. The instructions 945b may be executed by the processor 943 to implement the methods disclosed herein.

The base station 902 may also include a housing that contains a transmitter 951 and a receiver 953 to allow transmission and reception of data. The transmitter 951 and receiver 953 may be combined into a transceiver 949. One or more antenna 912a-n are attached to the housing and electrically coupled to the transceiver 949.

The various components of the base station 902 are coupled together by a bus system 961, which may include a power bus, a control signal bus, and a status signal bus, in addition to a data bus. However, for the sake of clarity, the various buses are illustrated in FIG. 9 as the bus system 961. The base station 902 may also include a digital signal processor (DSP) 957 for use in processing signals. The base station 902 may also include a communications interface 959 that provides user access to the functions of the base station 902. The base station 902 illustrated in FIG. 9 is a functional block diagram rather than a listing of specific components.

Figure 10:
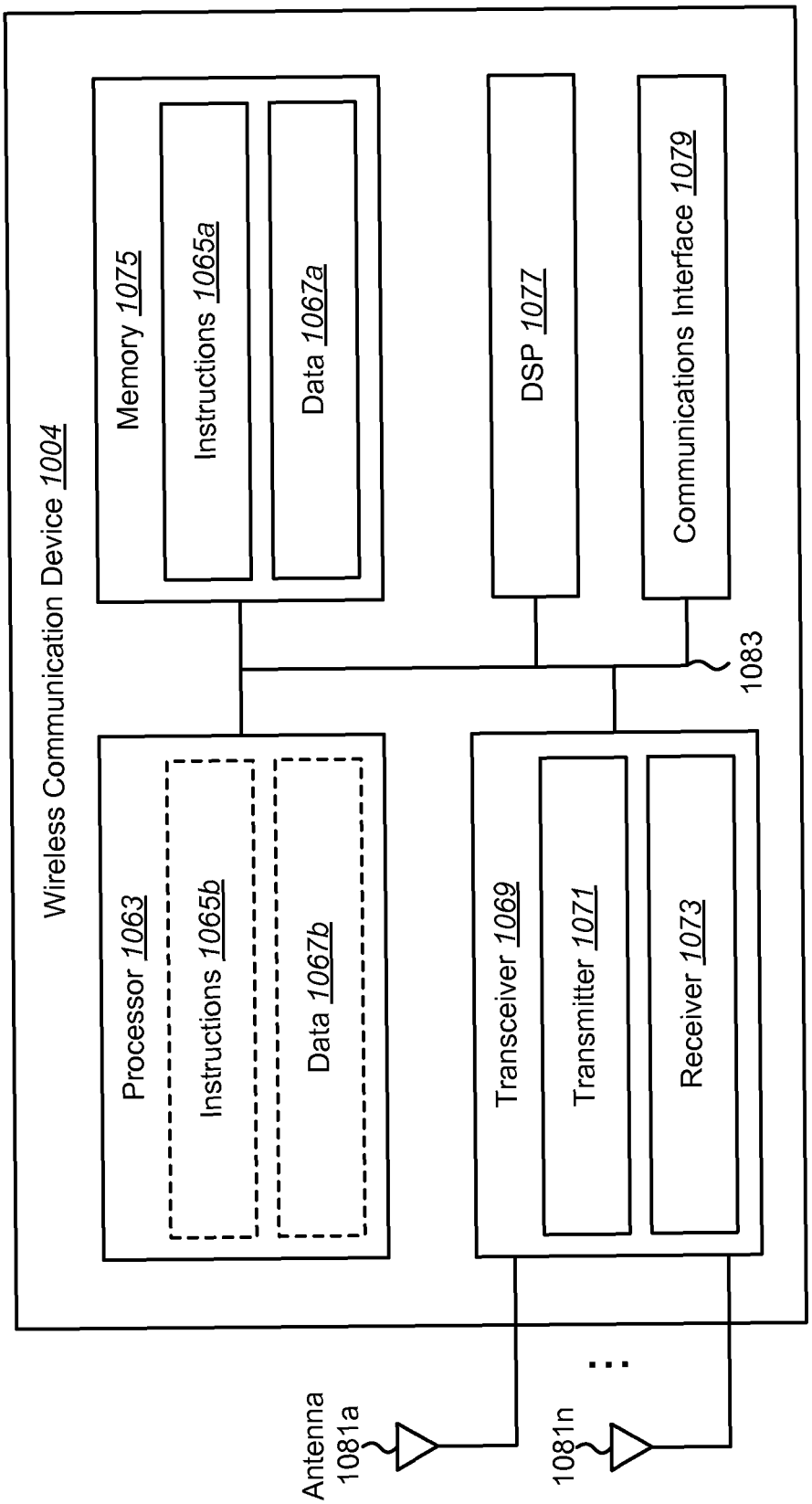
FIG. 10 illustrates various components that may be utilized in a wireless communication device.

FIG. 10 illustrates various components that may be utilized in a wireless communication device 1004. The wireless communication device 1004 may be utilized as the wireless communication device 104 in FIG. 1. The wireless communication device 1004 may include components that are similar to the components discussed above in relation to the base station 902, including a processor 1063, memory 1075 that provides instructions 1065a and data 1067a to the processor 1063, instructions 1065b and data 1067b that may reside in the processor 1063, a housing that contains a transmitter 1071 and a receiver 1073 (which may be combined into a transceiver 1069), one or more antennas 1081a-n electrically coupled to the transceiver 1069, a bus system 1083, a DSP 1077 for use in processing signals, a communications interface 1079, and so forth.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for assigning and coordinating uplink reference signals for cooperative communication, comprising:
   receiving, at a non-serving base station, data about an assigned uplink reference signal sequence used by a wireless communication device, wherein the data comprises first tier parameters, second tier parameters or irreducible parameters from which a reference signal estimate is derived, and wherein the first tier parameters are used to determine second tier parameters;
   determining, at the non-serving base station, an uplink reference signal estimate based on the data; and
   using the uplink reference signal estimate to coherently demodulate a signal received from the wireless communication device or to estimate an uplink channel between the non-serving base station and the wireless communication device.

2. The method of claim 1, further comprising reserving a set of uplink reference signal sequences for coordinated reception by multiple base stations.

3. The method of claim 2, further comprising:
   partitioning the set of uplink reference signal sequences; and
   assigning an index to each partition, wherein indexes assigned to each partition are known to the wireless communication device, the non-serving base station, and a serving base station, wherein the received data about an assigned uplink reference signal sequence is an index of a partition that is going to be used for an uplink transmission from the wireless communication device.

4. The method of claim 3, wherein the partitioning comprises grouping uplink reference signal sequences together that have a minimum cross correlation.

5. The method of claim 3, wherein the partitioning comprises determining a number of uplink reference signal sequences in a partition based on a number of available uplink spatial layers.

6. The method of claim 1, wherein the data about an assigned uplink reference signal sequence is received from a serving base station over a direct wired link.

7. The method of claim 1, wherein the data about an assigned uplink reference signal sequence is received from a serving base station over a direct wireless link.

8. The method of claim 1, wherein the data about an assigned uplink reference signal is received from a serving base station over a backbone network connection, wherein the non-serving base station is a home eNodeB.

9. The method of claim 1, wherein the data about an assigned uplink reference signal sequence is received from a wireless communication device over a wireless link.

10. The method of claim 1, wherein the first tier parameters comprise a group hopping pattern, a sequence-shift pattern, a pseudorandom sequence and a first cyclic shift.

11. The method of claim 10, wherein the second tier parameters comprise a group number, a sequence index of the assigned uplink reference signal and a second cyclic shift.

12. The method of claim 1, wherein the irreducible parameters comprise a physical cell identity, a sequence-shift increment, a first cyclic shift and a slot number.

13. The method of claim 1, wherein the receiving comprises receiving data about more than one assigned uplink reference signal sequence and the determining comprises determining more than one uplink reference signal estimate based on the data.

14. The method of claim 13, further comprising assigning the uplink reference signal sequences in order to minimize a size of the data about the uplink reference signal sequences.

15. The method of claim 1, wherein the assigned uplink reference signal sequence is a Sounding Reference Signal (SRS).

16. The method of claim 1, wherein the assigned uplink reference signal sequence is a Demodulation Reference Signal (DMRS).

17. A base station for assigning and coordinating uplink reference signals for cooperative communication, comprising:
a processor;
memory in electronic communication with the processor; and
instructions stored in the memory, the instructions being executable by the processor to:
receive, at a non-serving base station, data about an assigned uplink reference signal sequence used by a wireless communication device, wherein the data comprises first tier parameters, second tier parameters or irreducible parameters from which a reference signal estimate is derived, and wherein the first tier parameters are used to determine second tier parameters;
determine, at the non-serving base station, an uplink reference signal estimate based on the data; and
use the uplink reference signal estimate to coherently demodulate a signal received from the wireless communication device or to estimate an uplink channel between the non-serving base station and the wireless communication device.

18. The base station of claim 17, wherein the data about an assigned uplink reference signal sequence is received from a serving base station over a direct wired link.

19. The base station of claim 17, wherein the data about an assigned uplink reference signal sequence is received from a serving base station over a direct wireless link.

20. The base station of claim 17, wherein the data about an assigned uplink reference signal is received from a serving base station over a backbone network connection, wherein the non-serving base station is a home eNodeB.

21. The base station of claim 17, wherein the data about an assigned uplink reference signal sequence is received from a wireless communication device over a wireless link.

22. The base station of claim 17, wherein the first tier parameters comprise a group hopping pattern, a sequence-shift pattern, a pseudorandom sequence and a first cyclic shift.

23. The base station of claim 22, wherein the second tier parameters comprise a group number, a sequence index of the assigned uplink reference signal and a second cyclic shift.

24. The base station of claim 17, wherein the irreducible parameters comprise a physical cell identity, a sequence-shift increment, a first cyclic shift and a slot number.

25. The base station of claim 17, wherein the assigned uplink reference signal sequence is a Sounding Reference Signal (SRS).

26. The base station of claim 17, wherein the assigned uplink reference signal sequence is a Demodulation Reference Signal (DMRS).

27. A non-transitory computer-readable medium comprising executable instructions for assigning and coordinating uplink reference signals for cooperative communication, comprising executable instructions for:
receiving, at a non-serving base station, data about an assigned uplink reference signal sequence used by a wireless communication device, wherein the data comprises first tier parameters, second tier parameters or irreducible parameters from which a reference signal estimate is derived, and wherein the first tier parameters are used to determine second tier parameters;
determining, at the non-serving base station, an uplink reference signal estimate based on the data; and
using the uplink reference signal estimate to coherently demodulate a signal received from the wireless communication device or to estimate an uplink channel between the non-serving base station and the wireless communication device.

28. The non-transitory computer-readable medium of claim 27, wherein the data about an assigned uplink reference signal sequence is received from a serving base station over a direct wired link.

29. The non-transitory computer-readable medium of claim 27, wherein the data about an assigned uplink reference signal sequence is received from a serving base station over a direct wireless link.

30. The non-transitory computer-readable medium of claim 27, wherein the data about an assigned uplink reference signal is received from a serving base station over a backbone network connection, wherein the non-serving base station is a home eNodeB.

31. The non-transitory computer-readable medium of claim 27, wherein the data about an assigned uplink reference signal sequence is received from a wireless communication device over a wireless link.

32. The non-transitory computer-readable medium of claim 27, wherein the first tier parameters comprise a group hopping pattern, a sequence-shift pattern, a pseudorandom sequence and a first cyclic shift.

33. The non-transitory computer-readable medium of claim 32, wherein the second tier parameters comprise a group number, a sequence index of the assigned uplink reference signal and a second cyclic shift.

34. The non-transitory computer-readable medium of claim 27, wherein the irreducible parameters comprise a physical cell identity, a sequence-shift increment, a first cyclic shift and a slot number.

35. The non-transitory computer-readable medium of claim 27, wherein the assigned uplink reference signal sequence is a Sounding Reference Signal (SRS).

36. The non-transitory computer-readable medium of claim 27, wherein the assigned uplink reference signal sequence is a Demodulation Reference Signal (DMRS).

* * * * *